W. MURKLAND.
Jacquards for Looms.
No. 146,544.
3 Sheets--Sheet 2.
Patented Jan. 20, 1874.
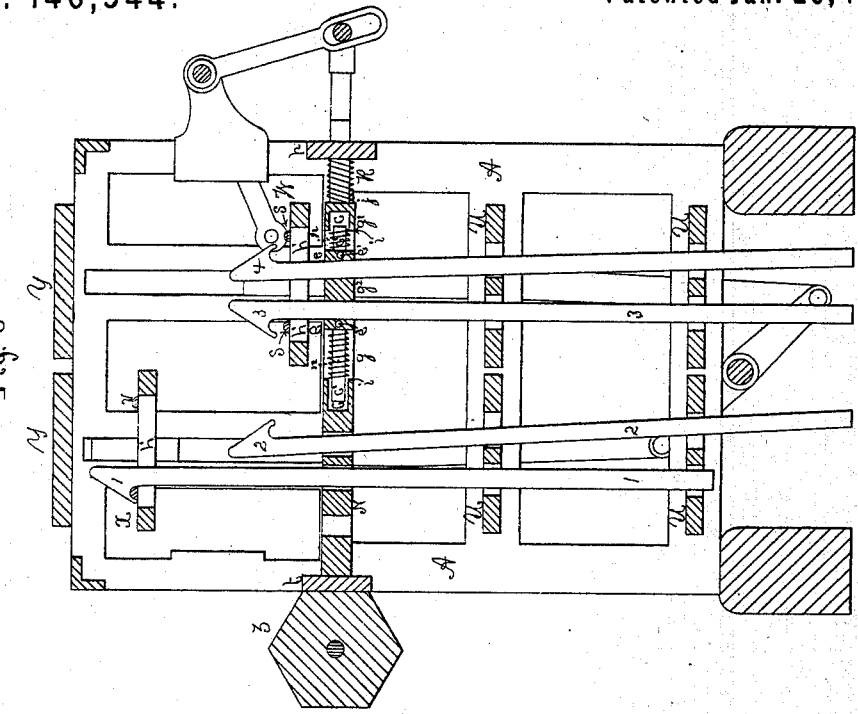
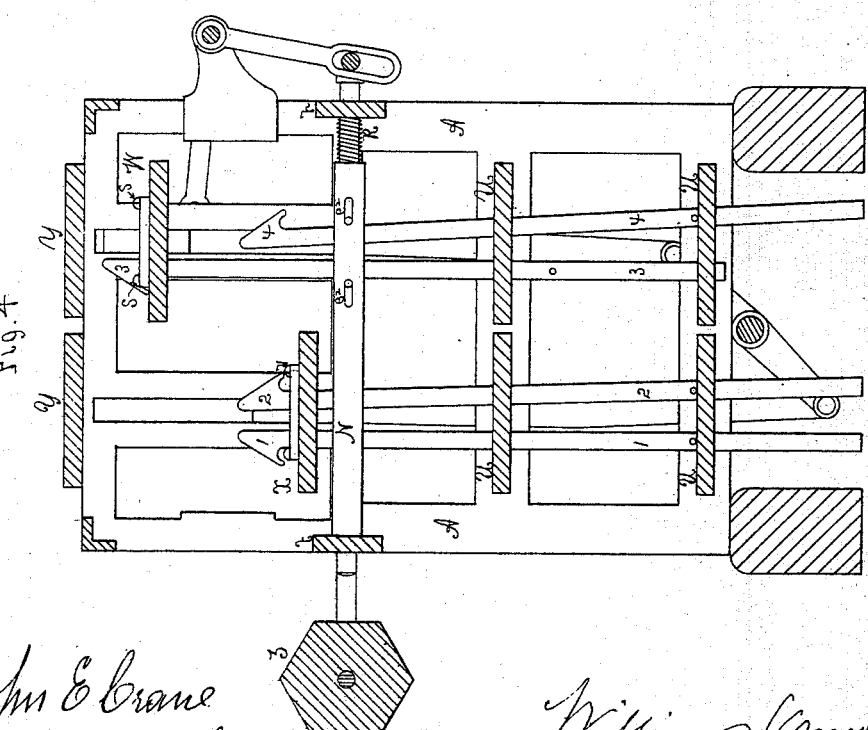

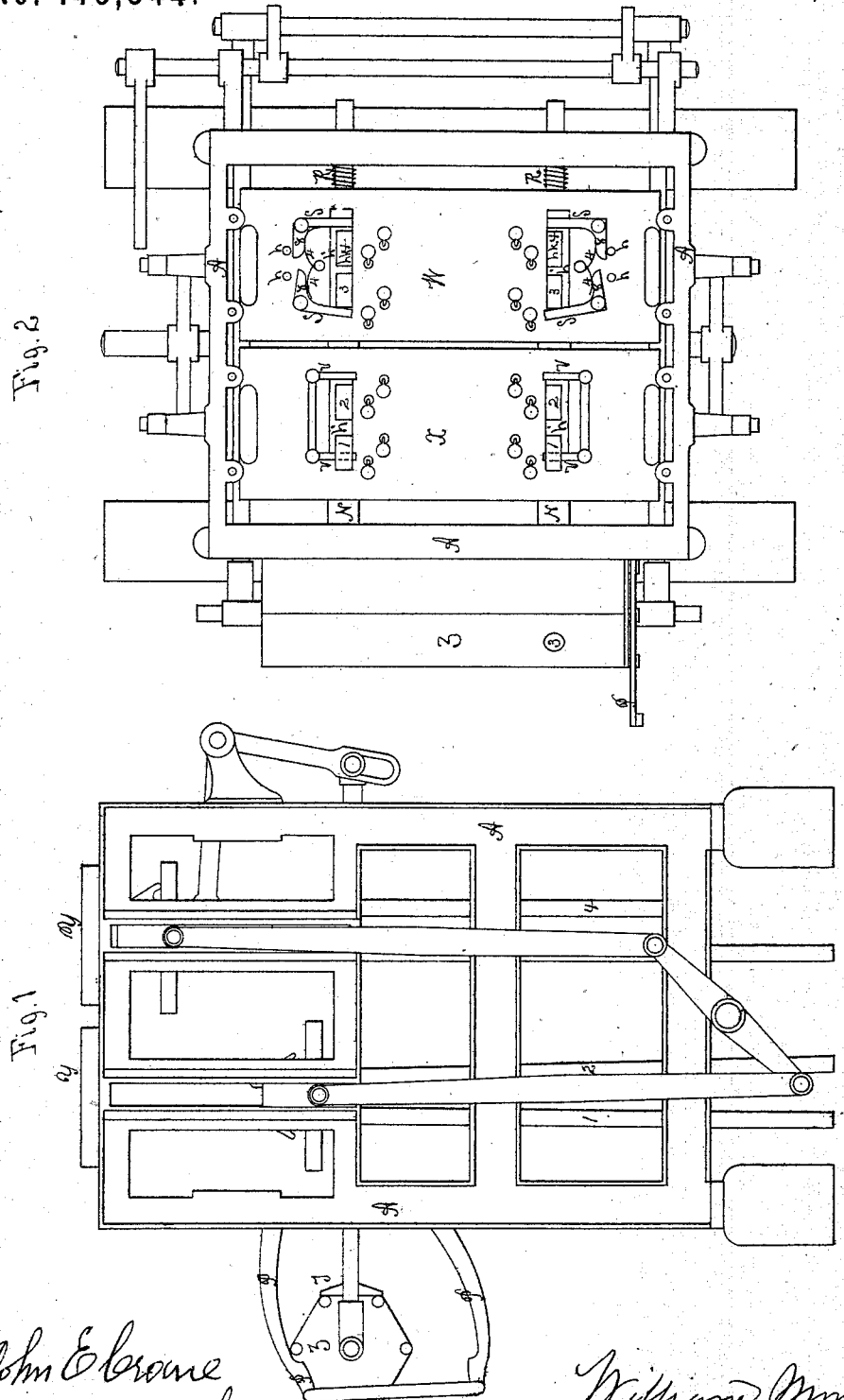

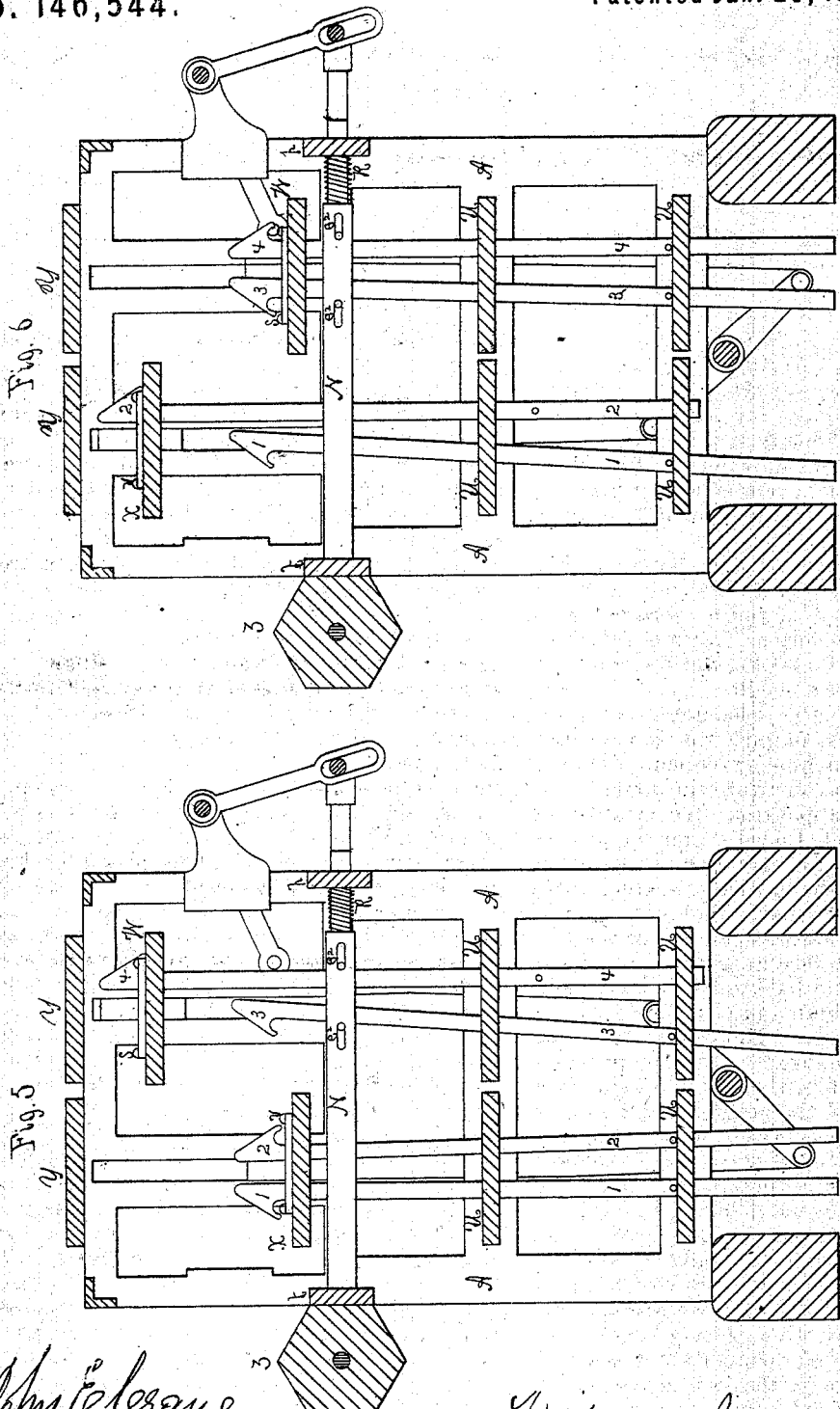

UNITED STATES PATENT OFFICE.

WILLIAM MURKLAND, OF LOWELL, MASSACHUSETTS, ASSIGNOR TO JOSIAH GATES, OF SAME PLACE.

IMPROVEMENT IN JACQUARDS FOR LOOMS.

Specification forming part of Letters Patent No. 146,544, dated January 20, 1874; application filed November 17, 1873.

*To all whom it may concern:*

Be it known that I, WILLIAM MURKLAND, of Lowell, in the county of Middlesex and State of Massachusetts, have invented certain new and useful Improvements in the Jacquards for Looms, of which the following is a full, clear, and exact description, reference being had to the accompanying drawings making part of this specification, in which—

Figure 1 represents an end elevation; Fig. 2, a plan or top view with the top boards Y removed. Figs. 3, 4, 5, and 6 represent each a cross-section—the former, 3, through the needle at one side of the hooks, and the three latter at one side of the needle.

This invention relates to loom-jacquards, and has for its object to simplify the construction and cheapen the machine by reducing the number of parts which constitute the journal and harness operating apparatus. It consists of the peculiarly-constructed needle and the pivoted swinging hook-bars, so arranged in relation to each other and to the journal-operating hooks and other connected parts that each journal and its connected harness can be operated by a single hook, if preferred, all the hooks being pressed forward and backward by the needle, actuated by the cylinder and by a spring at the rear end of the needle. The rear hooks 3 and 4 have a yielding action by means of springs in the shell of the needle, in addition to that given by the movement of the needle. All the hooks are alternately or successively hooked onto their bars, to operate their journals and harnesses without the aid of the ordinary vertical and cross shafts, cams, and levers. The swinging hook-bars are arranged to be pressed back by the rear hooks, to allow the rear hooks to pass their bars when the trap-boards are lowered, and to hook onto their bars and raise the rear journals and their harnesses when the trap-boards are raised. The six-sided cylinder has holes in alternate sides to receive the ends of the needles and alternate plain sides to press back the needles. When the side with holes is presented to the end of the needle, the needle remains at rest and allows the forward hook in each pair of hooks to hook onto its bar; and, when the plain side of the cylinder presses the needle back, it carries the rear hook of each pair of hooks back to a position where they will engage with the rear bars alternately.

In the drawings, A represents the frame, and Z the cylinder; Y, the top-boards; X, the front, and W the rear, trap-board, which, with the guides U, hammer T, and the front and rear needle-boards $t$ and $p$, are constructed and arranged as usual. The needle N, constructed as described, is a new and very useful element; so also the pivoted swinging hook-bars S; and these elements enable me to employ four hooks, 1 2 3 4, at one or both ends of the jacquard, and thereby to operate each journal and its harness by a single hook, or by a single pair of front, rear, or middle hooks, when such hooks and swinging bars are used on both ends of the machine. In the construction of the said needle the forward part is slotted vertically for the easy passage of the two forward hooks 1 and 2, and the slots are long enough to admit of either forward hook assuming an inclined position when the other forward hook is hooked onto its bar on the trap-board, and so that either forward hook will pass through the slot between the fixed bars $r$, when the trap-board descends, and ready to be pressed forward or backward, according to the movement of the needle. The rear part of the needle has longer vertical slots, $g$ and $g^1$, with a fixed bar, $g^2$, between them, the hooks sliding up and down each side of the bar. Forward of the hook 3, and back of the hook 4, and within each slot $g$ and $g^1$, is a sliding block, $e$, having pins $e^1$ projecting from each end, and movable in slots $e^2$ through the opposite sides of the needle. Each block $e$ has a connected spindle, $c'$, sliding in a socket, $c$, in the needle, and on each spindle is a spiral spring, $n$, between each block $e$, and a shoulder, $i$, in each slot. The spiral springs $n$ cause the blocks $e$ to press the hooks against or toward the bar $g^2$, but allow the hooks to yield alternately as they are pressed forward or back by the needle, which is actuated by the cylinder Z, or by the spring R on the rear end of the needle, said spring being placed between the rear needle-board $p$ and a shoulder, $j$, on the needle. Both the forward and the rear trap-boards have slots $h'$ for the passage of the heads of the hooks when the traps descend, and each slot $h'$ has a hook-bar at each end thereof, to catch and hold the hook that is to be raised. The bars r on the forward trap-board are fixed, but the bars S on the rear trap-board are in two parts, and pivoted, as shown in Fig. 2, so as to swing back against the action of springs 4, arranged and fastened to the trap-board inside of the arm 8 of each pivoted bar, and so as to allow the heads of the rear hooks 3 and 4 to pass their bars and hook onto them when the rear trap-board descends. The position of one of these pivoted hook-bars swung back, and with the hook 3 in the act of passing the pivoted bar, is clearly shown in Fig. 2. These pivoted hook-bars have stops $h$ beyond their arms 8, to prevent the springs 4 pressing them back so far as to bring the bars S too near the hooks. The rear hook-bar on the rear trap-board is shown in about the right position, with its arm against the stop $h$.

When the jacquard is properly connected with, say, a carpet-loom, and operating, the lower ends of the hooks on their rods are connected with the journals of the several harnesses, and operate as follows: The rear hook 4 is raised by the rear trap-board, as seen in Fig. 5, and hook 1 is ready to hook onto its bar on the forward trap-board, the cylinder Z being pressed against the front needle-board, and the needle end in the hole in the cylinder, as in Fig. 2. The next movement raises the forward trap X, which raises the hook 1, and, as the forward trap rises and the rear one descends, the hook 3 presses back the hook-bar S, as shown in Fig. 2, and passes the bar, and, as the rear trap rises by the next movement, it is raised, as in Fig. 4. Again turning the cylinder by the hook P, one of its plain sides is brought against the end of the needle, pressing the needle back with the upper ends of the three unconnected hooks, and this brings the hook 2 directly over its bar, and the next movement raises the forward trap and the hook 2, as seen in Fig. 6. Still pressing back the needle, the next movement raises the rear trap, and with its hook 4, as seen in Fig. 5. The next movement turns the cylinder and presses one of its hole-furnished sides against the front needle-board, and the forward trap and hook 1 ascend, as before described, assuming a position as shown in Fig. 6. When the plain sides of the cylinder are pressed against the end of the needle, the hooks 2 and 4 are in action; and when the hole-furnished sides of the cylinder are pressed against the front needle-board, the needle is not moved, and the hooks 1 and 3 are in action. Thus the changing of the hooks is effected by pressing back the needle and by the pivoted swinging hook-bars operating as described.

I claim as my invention—

1. The needle N, constructed, as described, with slots for the forward hooks, and longer slots $g$ and $g^1$ for the rear hooks, and with spindle-furnished sliding blocks $e$, having springs $n$ and pins $e^1$, working in slots $e^2$ through the opposite sides of the needle, in combination with the hooks 1 2 3 4, the cylinder Z, spring R, and with the fixed and the pivoted spring-actuated swinging hook-bars $r$ and S, all arranged and operating substantially in the manner and for the purpose described.

2. The pivoted spring-furnished swinging hook-bars S, constructed and applied as described, in combination with the moving trap-boards, and with the hooks 1 2 3 4 and the needle N, all arranged and operating substantially in the manner and for the purpose described.

3. The combination of the pivoted spring-actuated swinging hook-bars S and the needle N and hooks 1 2 3 4, each constructed as described, and all arranged and operating substantially as and for the purpose set forth.

WILLIAM MURKLAND.

Witnesses:
  JOHN E. CRANE,
  WILLIAM R. CRANE.